Jan. 26, 1971  B. TRIGLIA  3,557,584

SAFETY LOCK FOR VEHICLES

Filed Aug. 20, 1968  4 Sheets-Sheet 4

INVENTOR
BENITO TRIGLIA
BY
Richards & Geier
ATTORNEYS

# United States Patent Office 3,557,584
Patented Jan. 26, 1971

3,557,584
SAFETY LOCK FOR VEHICLES
Benito Triglia, 11 Pine Ave., Ossining, N.Y. 10562
Filed Aug. 20, 1968, Ser. No. 753,996
Int. Cl. B60r 25/02; E05b 65/12; G05g 5/16
U.S. Cl. 70—179                4 Claims

ABSTRACT OF THE DISCLOSURE

A vehicle provided with hydraulic brakes is locked by hydraulic braking means by locking one or more of the four wheels of the vehicle. This is accomplished by a master safety lock control which is operated by turning the ignition key. The steering column can be also locked by a hydraulic brake. The ignition key can be provided with a self-ejecting device.

---

This invention relates to a safety lock for vehicles.

An object of the present invention is the provision of quick and sure means for locking the wheels and/or the steering of an automobile, bus, truck or any other vehicle provided with hydraulic brakes.

Another object is the provision of a lock which will render a vehicle immovable on its own wheels which are held locked.

A further object is the provision of a lock of the above described type which is also provided with an ejector for the ignition key. Yet another object is the provision of hydraulic means for locking the steering column.

Other objects of the present invention will become apparent in the course of the following specification.

In the accomplishment of the objectives of the present invention it was found desirable to provide a safety lock which is operated by turning off the ignition and operating the brake pedal directly from the driver's seat. The lock then retains the brake fluid pressure on the brakes so that the wheels cannot move. The lock can be mounted under the dashboard in line with the ignition key and is supported from the framework. A similar construction can be used to lock the steering column. The lock for the steering column utilizes a standard brake cylinder and a set of levers mounted in a steel box supported by a bracket from the frame of the vehicle. The ignition key may be provided with an ejector spring which expels the key in the off position when the brakes are locked on the wheels and the steering.

The invention will appear more clearly from the following detailed description when taken in connection with the accompanying drawings, showing by way of example, a preferred embodiment of the inventive idea.

Figure 1:
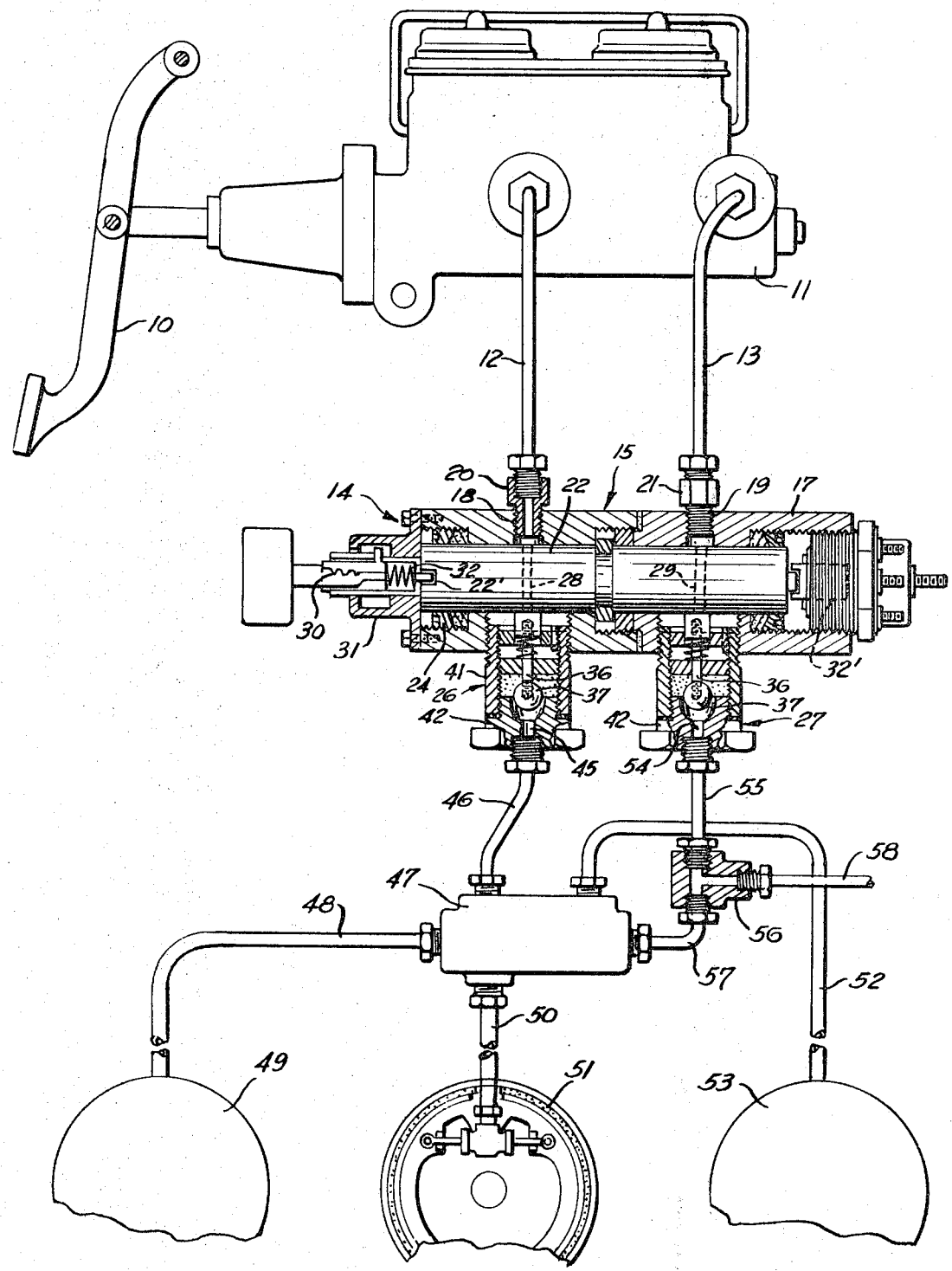
FIG. 1 is a diagrammatic sectional view illustrating the safety lock as applied to vehicle brakes, the various parts being shown out of proportion for clarity of illustration.

The example illustrated in the drawings shows a safety lock which can be used for locking all four wheels of a car as well as the steering column. It is apparent, however, that the lock can be used for locking only one wheel, or two or three wheels. Furthermore, the locking of the steering column can be dispensed with. On the other hand, a construction can be provided for locking only the steering column without locking any of the wheels.

FIG. 1 shows the usual foot brake pedal 10 which is used to operate the brake master cylinder 11 of standard construction. Pipes 12 and 13 connect the cylinder 11 with the master safety lock adjusting valve 14 constituting a part of the present invention.

The valve 14 includes a casing 15 consisting preferably of two interconnected parts 16 and 17 and carrying two threaded tubes 18 and 19. The tube 18 is connected with the aid of a screw 20 with the pipe 12 while the tube 19 is connected with a screw 21 and the pipe 13. A movable valve body 22 is located within the casing 15. The movable member 22 is provided with a centering ring 23 and is supported within the casing by suitable bearings 24 and 25.

Two master safety lock controls 26 and 27 which constitute important features of the present invention, are carried by the casing 15, the lock control 26 being carried by the casing part 16, while the lock control 27 is carried by the casing part 17. The valve body 22 has passages 28 and 29. In the inoperative position of the lock the passage 28 provides communication between the pipe 12 and the lock control 26 while the passage 29 provides a communication between the pipe 13 and the lock control 27.

The valve 14 is operated by an ignition key 30 which fits into a cover plate 31 fixed to the casing part 16. A key ejector having a spring 32 is built into the key, so that the key will be expelled in the off position when the brakes are locked on the wheels. The valve body 22 has a groove 22' into which the key can fit for turning the valve body.

The opposite end of the valve body 22 carries a switch 32'.

Since the lock controls 26 and 27 are of the same construction, only one of these lock controls will be described in detail.

Figure 2:
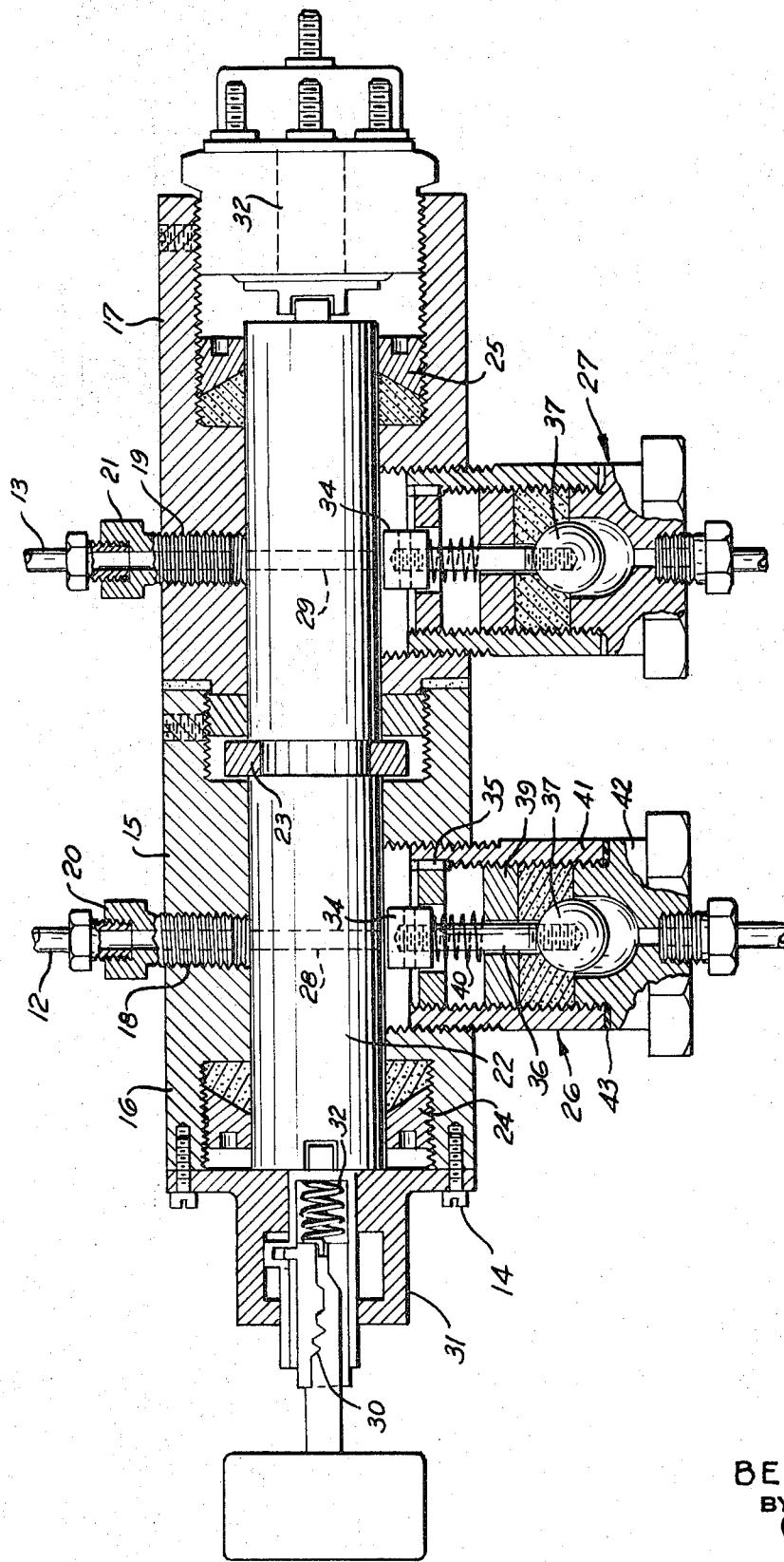
FIG. 2 is an enlarged sectional view of the safety lock control of FIG. 1.
Figure 4:
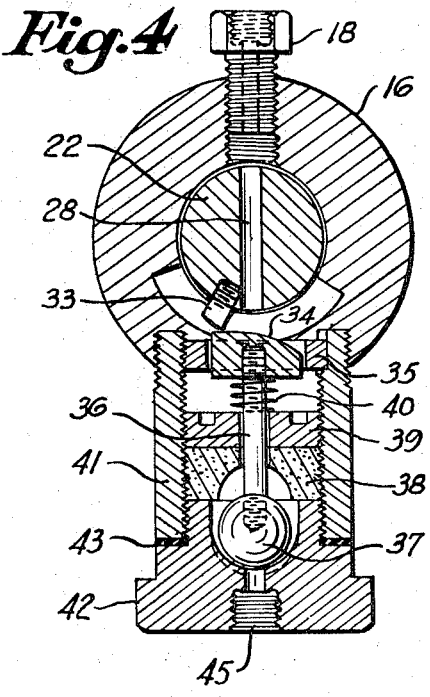
FIG. 4 is a detail sectional view showing the lock control in an off position.

FIGS. 1, 2 and 4 show the lock controls in the open position when the car brakes are normally operated. The lock control 26 includes a valve depressing pin 33 carried by the rotary member 22. The pin 33 is movable in and out of engagement with a valve shoe 34 which is enclosed by a guide ring 35. A stem 36 has one end threaded into the valve shoe 34 while its opposite end carries a steel ball 37. A gasket 38 and a retainer ring 39 enclose the central portion of the stem 36. A coiled spring 40 is located between the valve shoe 34 and the retainer ring 39. A tubular casing 41 encloses the guide ring 35, the gasket 38 and the retainer ring 39 and carries a hexagonal end closure 42, a gasket 43 being provided between the closure 42 and the casing 41.

In this open inoperative position of the lock, a connection for the brake fluid is provided from the pipe 12, through the passage 28 of the rotary body 22, through passage 44 in the lock control and into the outlet 45.

Figure 4A:
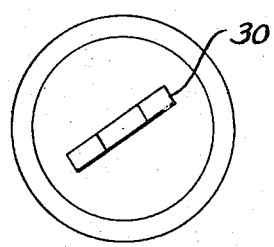
FIG. 4a is a top view indicating the location of the ignition key in the off position of the lock.
Figure 5A:
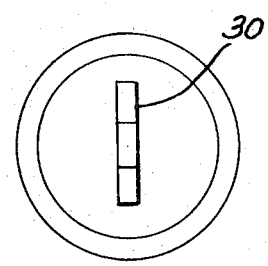
FIG. 5a is similar to FIG. 4a but shows the location of the ignition key in the on position of the lock.

The position of the ignition key 30 in this inoperative position is indicated in FIG. 4a.

In actual use the described lock control can be mounted upon the dashboard in line with the ignition key. The brake fluid piping can be encased in one enclosed covering.

The outlet 45 of the lock control 26 is connected by a pipe 46 with the usual oil distributing fitting 47. A pipe 48 leads from the fitting 47 to the left front wheel brake 49. Another pipe 50 leads from the fitting 47 to the right front wheel brake 51, while a pipe 52 connects the fitting 47 with the two back wheel brakes 53.

The outlet 54 of the lock control 27 is connected by a pipe 55 to a three-way connection 56. The connection 56 communicates with the fitting 47 by a pipe 57. However, the connection 56 is also provided with a pipe 58 leading to the steering wheel safety lock 59 (FIG. 3).

The steering wheel safety lock 59 includes a push rod 60 operating a valve 61 which is connected to a brake cylinder 62. The push rod 60 may have a knob (not shown) located on the dashboard or close to the steering column for easy operation. The lower end of the push rod extends through a guide 63 screwed upon the casing 64 of the valve 61. This end of the push rod carries a ball 65 located within the hollow interior 66 of the valve. The pipe 58 leads into this hollow space 66. A passage 67 connects the inner space 66 with a pipe 68 leading into the brake cylinder 62. The brake cylinder 62 has the shape of a box with a casing 69 which is weatherproof and is mounted on a suitable bracket in the vehicle. The casing 69 carries a cover plate 70 which is screwed thereon. Inside the cover or casing 69 is a double acting brake fluid cylinder 71 to which the end of the pipe 68 is connected. Levers 72 and 73 which are actuated by the oil in the cylinder 71 in the usual manner are connected with brake elements 74 and 75, respectively, having brake linings 76 and 77 engaging on opposite sides a shoe 78. The shoe 78 encloses a steel ring rod 79 connected to the steering column. The cover 69 also carries a tie rod 80.

Figure 3:
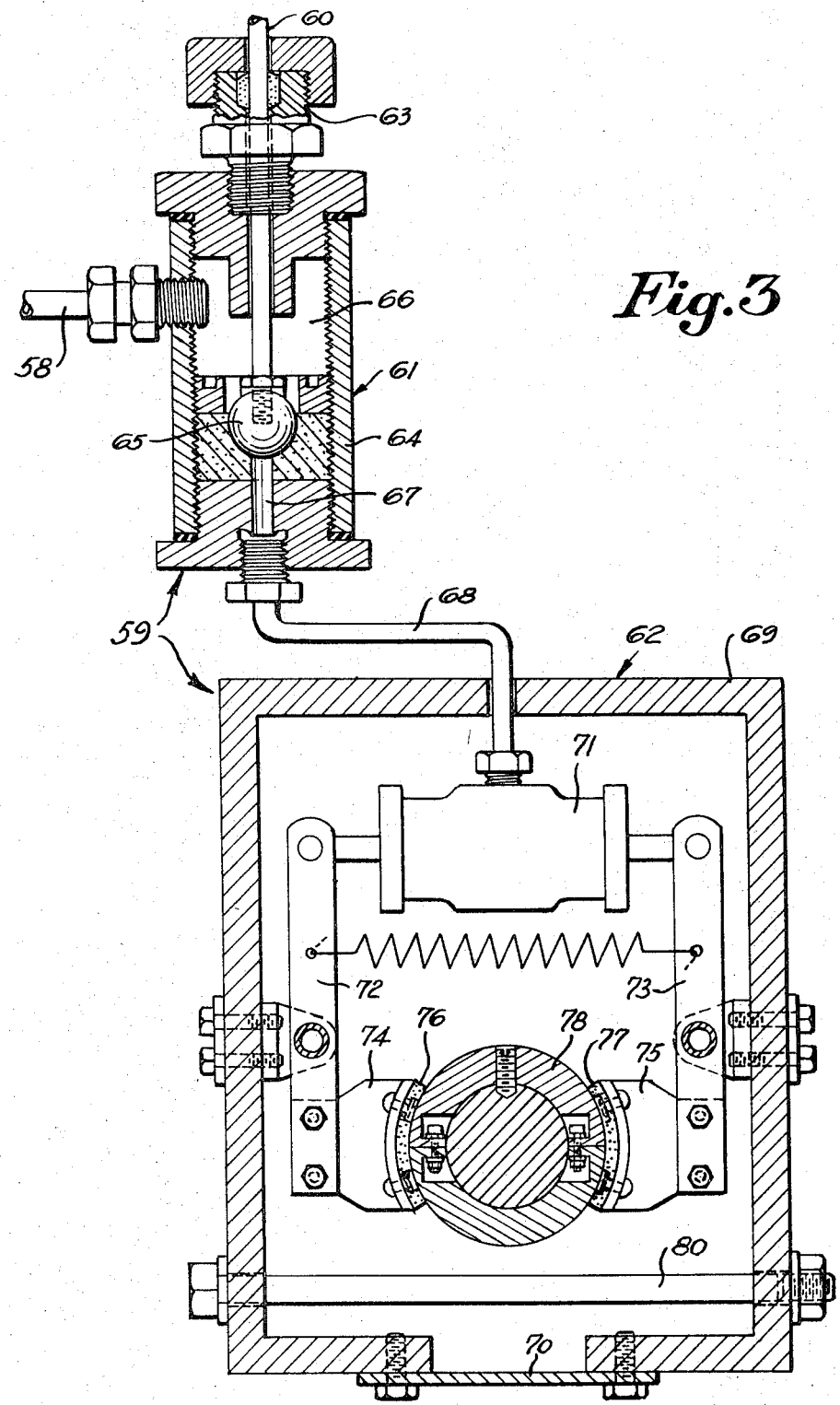
FIG. 3 is a diagrammatic sectional view illustrating the safety lock as applied to the steering wheel.

In the position shown in FIG. 3, the ball 65 closes the passage 67 so that the lock is operative. Brake fluid in the oil cylinder 71 actuates the brake elements 74 and 75 which press against the shoe 78 and prevent the steering column from moving.

Figure 6:
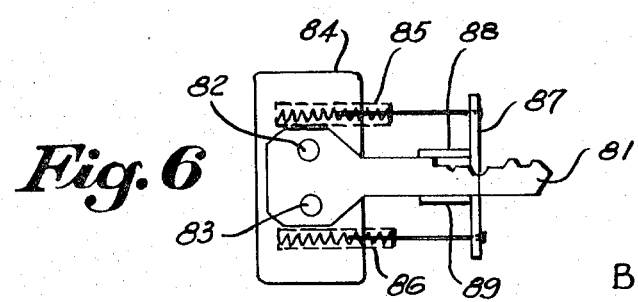
FIG. 6 is a diagrammatic sectional view illustrating the ignition key expeller with adapter for use with present keys.

As already stated, the lock of the present invention is operated by an ignition key 30 provided with an ejector spring 32 which expels the key in the off position (FIG. 1); however, an ignition key 81 now in general use may be also provided with a key expeller and adapter. As shown in FIG. 6 the key 81 cooperates with push buttons 82 and 83 carried by split clamp plates 84. Two springs 85 and 86 extend from the plates 84 to a support 87 carrying guides 88 and 89 for the key 81.

The operation of the safety lock of the present invention is actually apparent from the above description.

When the vehicle is in motion and the ignition key 30 or 81 is in the on position, brake fluid is delivered to the wheel brakes 49, 51 and 53 in the usual manner, since brake fluid will flow from the master cylinder 11 and through the valve 14 and the brake fluid distributing fitting 47 to the brakes. At that time the lock controls 26 and 27 are in the position shown in FIG. 4 wherein the valve balls 37 do not prevent the flow of the oil to the outlets 45.

Figure 5:
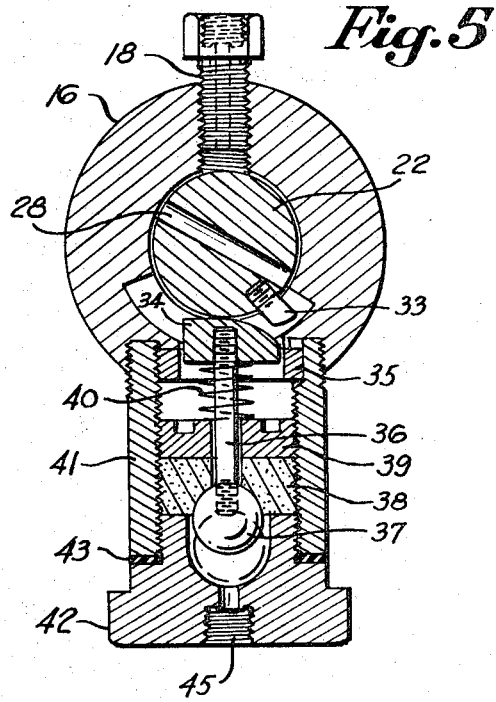
FIG. 5 is similar to FIG. 4 but shows the lock control in the on position.

To lock the vehicle, the user applies pressure on the brake pedal 10 and at the same time turns the ignition key to the off position. The ignition key will turn the valve body 22 so that the passages 28 and 29 will be disconnected from the lock controls; at the same time the pins 33 will release the valve shoes 34, so that the springs 40 will move the balls 37 into the locking positions, as shown in FIG. 5. Then the brake fluid in the wheel brakes is prevented from circulating, so that the wheels will be locked and prevented from turning.

The locking of the steering wheel is accomplished by essentially the same means except that a push rod 60 is used instead of the ignition key. The push rod 60 will close the valve 61 by the ball 65, thereby interrupting the circulation of brake fluid between the fitting 47 and the oil cylinder 71, so that brakes will be applied upon the steering column.

A further feature of the present invention is that the ignition key cannot remain in the off position, but will be ejected by devices shown in FIGS. 1 and 6, thus greatly improving the safety factor of the safety lock of the invention.

It is apparent that the described examples have been set forth solely by way of illustration and not by way of limitation and that they are capable of many variations and modifications within the scope of the present invention.

What is claimed is:

1. In a vehicle having wheels, hydraulic brakes for said wheels, a pedal-operated brake fluid supplying cylinder for said brakes and a steering column; a safety lock having a valve located between said cylinder and said brakes and comprising a casing, a rotary body within said casing and having at least one passage communicating with said cylinder in the off position of the lock, at least one lock control carried by said casing and having a passage communicating with at least one brake in the off position of the lock, said lock control having means for closing the last-mentioned passage when said rotary body is turned from the off position of the lock, said means comprising a pin carried by said rotary body, a valve shoe, adapted to engage said pin, a stem carried by said valve shoe, a ball carried by said stem and adapted to open and close the last-mentioned passage and a spring engaging said valve shoe and pressing said valve shoe against said pin and said rotary body.

2. In a vehicle having wheels, hydraulic brakes for said wheels, a pedal-operated brake fluid supplying cylinder for said brakes, a steering column and a brake fluid distributing fitting connected with at least one of said brakes; a safety lock having a valve located between said cylinder and said brakes, means supplying brake fluid from said valve to said fitting, a brake cylinder having means for breaking the steering column, a valve connected with said brake cylinder and said brake fluid supplying means and a push rod operating the last-mentioned valve.

3. A safety lock in accordance with claim 2, wherein the last-mentioned valve comprises a casing enclosing a passage communicating with said brake fluid supplying means and having an outlet, and a ball carried by said push rod and closing said passage in the on position of the lock.

4. A safety lock in accordance with claim 2, wherein said brake cylinder comprises a double acting brake fluid cylinder and a pipe connecting said duble acting brake fluid cylinder with the outlet of the last-mentioned valve, and wherein said means for braking the steering column comprise a pair of brake elements and levers actuating said brake elements and actuated by said double acting brake fluid cylinder.

References Cited

UNITED STATES PATENTS

| 2,271,048 | 1/1942 | Spiro | 70—414 |

FOREIGN PATENTS

| 145,324 | 7/1920 | Great Britain | 70—242 |
| 449,095 | 6/1936 | Great Britain | 70—179 |
| 732,042 | 6/1955 | Great Britain | 70—179 |
| 994,268 | 8/1951 | France | 70—179 |
| 1,104,432 | 2/1968 | Great Britain | 70—175 |

MARVIN A. CHAMPION, Primary Examiner

ROBERT L. WOLFE, Assistant Examiner

U.S. Cl. X.R.

70—184, 228, 237, 388, 414; 180—114